United States Patent [19]

Tanaka

[11] Patent Number: 4,519,769
[45] Date of Patent: May 28, 1985

[54] APPARATUS AND METHOD FOR THE COMBUSTION OF WATER-IN-OIL EMULSION FUELS

[76] Inventor: Akio Tanaka, No. 565, Tobori, Himeji-shi, Hyogo, Japan

[21] Appl. No.: 552,192

[22] Filed: Nov. 15, 1983

Related U.S. Application Data

[63] Continuation-in-part of Ser. No. 376,048, May 7, 1982, abandoned.

[30] Foreign Application Priority Data

Jun. 2, 1983 [JP] Japan .................................. 58-98507

[51] Int. Cl.³ .............................................. F23J 7/00
[52] U.S. Cl. ......................................... 431/4; 60/39.05; 60/39.55; 239/400; 239/403; 431/243; 431/352
[58] Field of Search ................ 431/158, 352, 242, 243, 431/4, 10, 11, 217; 239/400, 403; 60/39.05, 39.55, 39.58

[56] References Cited

U.S. PATENT DOCUMENTS

| | | | |
|---|---|---|---|
| 1,278,314 | 9/1918 | Dix | 60/39.55 |
| 1,567,482 | 12/1925 | Anthony | 239/404 |
| 2,402,826 | 6/1946 | Lubbock | 60/39.55 |
| 2,923,348 | 2/1960 | Fraser | 431/158 |
| 3,276,205 | 10/1966 | Reisman et al. | 60/39.55 |
| 3,359,723 | 12/1967 | Bohensky et al. | 60/39.05 |
| 4,416,610 | 11/1983 | Gallagher | 431/4 |

*Primary Examiner*—Carroll B. Dority, Jr.
*Attorney, Agent, or Firm*—Sughrue, Mion, Zinn, Macpeak & Seas

[57] ABSTRACT

A combustion apparatus is fitted to the top of an oil burner having a single nozzle for the simultaneous introduction of oil and water by means of compressed air. The apparatus includes a combustion chamber defined by an inner vessel open at both ends with one end being fitted to the burner. An outer vessel is co-axially mounted on the inner vessel with both ends being secured to the corresponding ends of the inner vessel to form a preheating chamber between the inner and outer vessels. The inner vessel is provided with a plurality of holes and a baffle is located within the pre-heating chamber in overlying relation with respect to the holes. Pressurized air is introduced into the heating chamber, around the baffle, and through the holes into the interior of the vessel to compress the flame of the water-oil fuel emulsion forcing it to swirl and remain in the vessel so that the combustion takes place at a temperature between 700° and 1,000° C.

2 Claims, 4 Drawing Figures

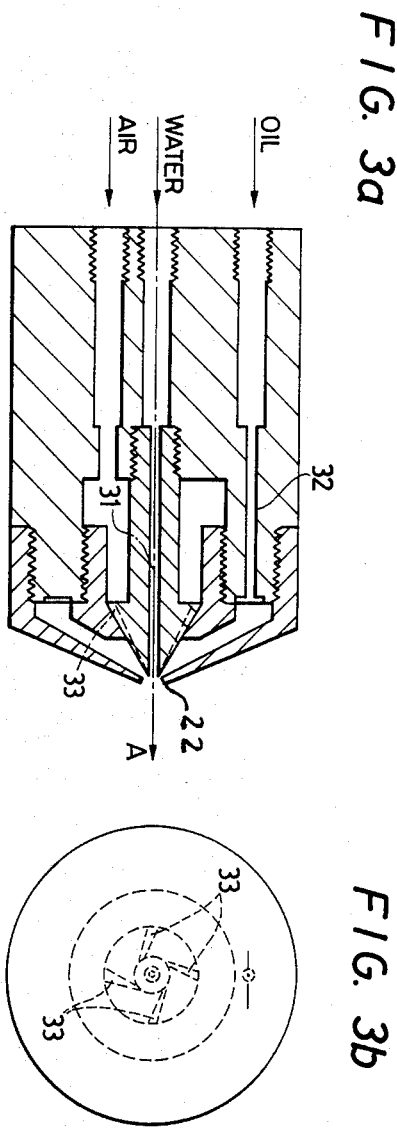
FIG. 3a
FIG. 3b
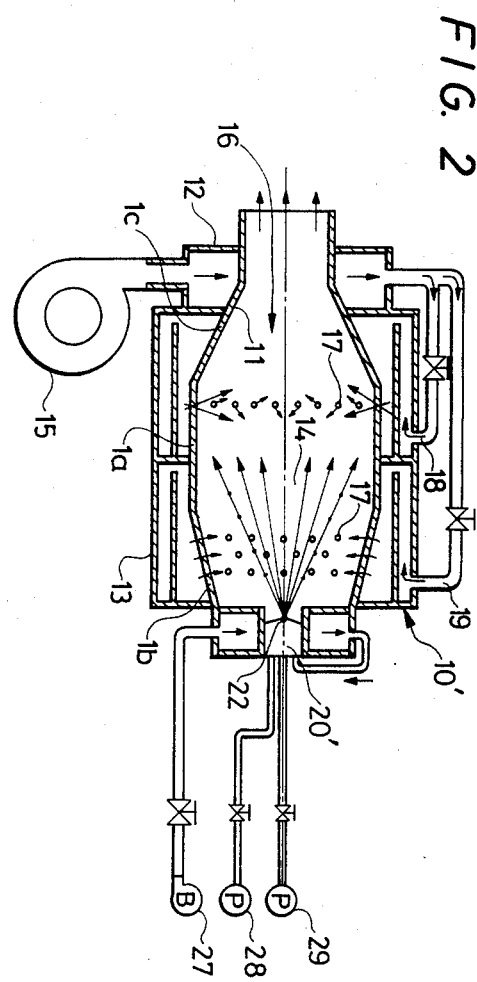
FIG. 2

APPARATUS AND METHOD FOR THE COMBUSTION OF WATER-IN-OIL EMULSION FUELS

CROSS REFERENCE TO RELATED APPLICATION

The present application is a continuation-in-part of application Ser. No. 376,048, filed May 7, 1982, now abandoned.

BACKGROUND OF THE INVENTION

The present invention relates to the combustion water-in-oil emulsion fuels. More specifically, it relates to an apparatus and a method for the combustion of water-in-oil emulsion fuels, which enables a great increase in the combustion efficiency of the fuel utilizing the water-gas shift reaction of the water-in-oil emulsion.

It is known to mix fuels with water and burn them as so called water-in-oil emulsions. In these emulsion fuels, however, the amount of water added is limited by the necessity of preventing heat-loss of the flame in order to increase the combustion efficiency of the fuel, or achieving complete combustion with the theoretical amount of air. Furthermore, since the combustion efficiency of a fuel varies significantly depending upon the structure of the combustion apparatus, the type of fuel, the heating conditions, and so forth, water-in-oil emulsions have poor general purpose properties. Thus, the effective upper limit of the amount of water which can be added is about twenty percent or less, and it is difficult to reduce the amount of fuel consumed by a proportion exceeding fifteen percent.

It has thus been desired to develop an apparatus and method for the combustion of such emulsion fuels which enables an increase in the water content of the fuel, and which conducts combustion at high efficiency.

SUMMARY OF THE INVENTION

The present invention relates to an apparatus to be fitted to the top of a burner for combustion of emulsion fuels which includes an inner vessel open at both ends. One of the ends is fitted to the burner, and a baffle is coaxially attached to the inner vessel at one end thereof. The other end thereof is open and forms an air preheating zone in combination with the inner cylindrical vessel. An outer vessel is coaxially mounted on the inner vessel, and both ends are secured to the corresponding ends of the inner vessel to form a closed chamber between the inner and outer vessels. The inner vessel is provided with a frusto-conical outlet portion having a plurality of holes at the portion surrounded by the baffle so that compressed air introduced from outside the outer vessel into the closed chamber can be admitted into the inner vessel through the air preheating zone, whereby the flame of the water-in-oil emulsion fuel from the burner is compressed, and is forced to swirl and remain in the inner vessel by the compressed air jetted through the holes, causing the micro-explosion of water particles and at the same time, pyrolysis of the water/oil emulsion.

The present invention also relates to a specific burner for use with the foregiong combustion apparatus wherein oil, water, and air under pressure are simultaneously supplied to a spray-type burner referred to hereinafter as a "three-fluid spray burner".

A method for the combustion of such emulsion fuels by the use of a burner includes the steps of jetting the water-in-oil emulsion fuel from the burner into an apparatus attached to the top of the burner and burning it in the apparatus, and introducing compressed air into the apparatus to cause the flame of the fuel to be compressed and forced to swirl and remain in the apparatus, causing the micro-explosion of water particles and at the same time, pyrolysis of the emulsion.

BRIEF DESCRIPTION OF THE DRAWINGS

FIG. 2 is a cross-sectional view of an apparatus according to a second embodiment of the invention.

FIG. 3a is a cross-sectional view of a burner nozzle usable with the apparatus of FIG. 2.

FIG. 3b is an end view of the nozzle of FIG. 3a.

DETAILED DESCRIPTION OF THE PREFERRED EMBODIMENTS

Figure 1:
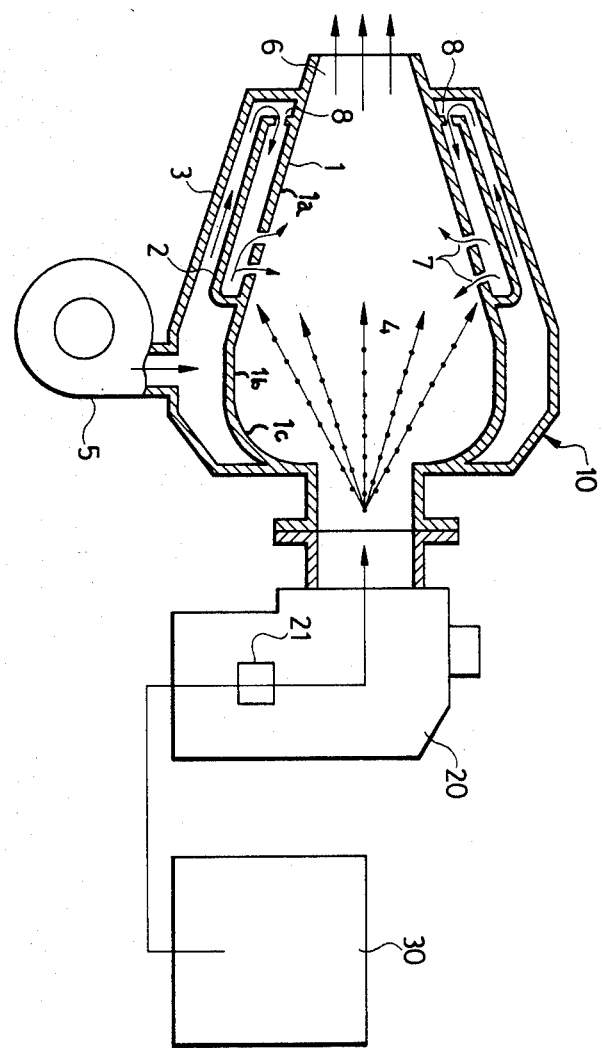
FIG. 1 is a cross-sectional view of an apparatus according to a first embodiment of the invention, fitted to a burner for the combustion of water-in-oil emulsion fuels.

In accordance with the invention, a combustion apparatus of heat resistant structure is designed so that compressed air can be introduced thereinto a swirl flow and is fitted to the top of an oil burner, and water/oil emulsion fuels are burned therein. Even when fuels having a water content as high as from forty to fifty percent are burned, combustion efficiency can be increased without causing heat loss by utilizing the high caloric gasses resulting from the water gas shift reaction in the combustion reaction. That is, the water/oil emulsion is mixed and compressed in the combustion apparatus at high temperatures from 700° to 1,000° C. by the preheated swirling air stream and is pyrolized by the residence phenomenon. The effect of the simultaneous combustion of hydrogen and water gasses formed by the above-described pyrolysis, and the synergistic effects resulting from the rapid and complete combustion of the fuel by oxygen in lesser amounts than the theoretical air amount, greatly increase the combustion efficiency of water-in-oil fuels and, therefore, markedly improve the general purpose properties of such fuels.

The above described water gas shift reaction is based on the following reaction formulae:

$$C_mH_n + mH_2O \rightleftharpoons mCO + (m+n/2)H_2$$

$$CO + H_2O \rightleftharpoons CO_2 + H_2$$

$$CO + 3H_2 \rightleftharpoons CH_4 + H_2O.$$

The extent to which the reaction proceeds is determined by the equilibrium constant under the reaction conditions.

The pyrolysis of heavy oil proceeds as follows:

$$C_mH_n \rightarrow mC + (N/2)H_2.$$

The gasses formed in the above reactions and the carbon and hydrogen formed by the above pyrolysis undergo the following exothermic reactions:

$$C + O_2 = CO_2 + 97.6 \text{ Kcal/mol}$$

$$H_2 + \tfrac{1}{2}O_2 = H_2O + 68.3 \text{ Kcal/mol}$$

$$CH_4 + 2O_2 = CO_2 + 2H_2O + 234.2 \text{ Kcal/mol}$$

$$CO + \tfrac{1}{2}O_2 = CO_2 + 68.2 \text{ Kcal/mol.}$$

In the combustion of water-in-oil emulsion fuels in the combustion apparatus of the invention, the high calorific gasses formed in the above reactions are utilized, permitting a great reduction in fuel under any condition in which the burner is used, compared with the combustion of oil alone by means of commercially available oil burners, or even when compared with the combustion of water/oil fuels without the use of the combustion apparatus of the invention in combination with a three fluid spray burner. Furthermore, emulsion fuels having a water content as high as from forty to fifty percent can be burned in the combustion apparatus of the invention. This leads to a marked reduction in the amount of $NO_x$, $SO_3$, etc., produced. Thus, the apparatus and method of the invention are very useful from the viewpoint of pollution prevention.

The invention will hereinafter be explained in greater detail with reference to the accompanying drawings.

Referring to FIG. 1, there is shown a combustion apparatus 10 according to a first embodiment of the invention mounted on an oilburner 20. A water/oil emulsion prepared in an emulsion preparation apparatus 30 is jetted into the combustion apparatus 10 through an oil burner 20 by means of fuel pump 21. Reference numeral 4 indicates a jetted droplet stream. The apparatus 10 comprises an inner vessel 1, a baffle 2 for preheating intake air, and an outer cylindrical vessel 3. The inner vessel 1 is provided with a larger diameter central cylindrical portion 1a, an inwardly tapered rear portion 1b having a reduced diameter opening secured to the outlet of the oil burner 20 and frusto-conical front portion 1c having a reduced diameter opening. The outer vessel 3 is provided with a configuration similar to the inner vessel 1 and is secured at opposite ends to the inner vessel in spaced relation thereto to define a first preheating chamber. The outlet of a blower 5 is connected to the first preheating chamber in the vicinity of the cylindrical portion 1a for supplying secondary air under pressure to the first preheating chamber. A plurality of small holes are provided in the frusto-conical portion 1c of the inner vessel. A baffle 2 is disposed in spaced relation to the frusto-conical portions of the inner and outer vessels and is connected at one end to the inner vessel between the holes 7 and the cylindrical portion 1a to define a second preheating chamber which is in communication with the first preheating chambers at the other end of the baffle. Thus, the air from the blower 5 is introduced into the second preheating chamber, through the first preheating chamber and the compressed air is then jetted into the interior of the inner vessel through the holes 7 to compress the flame of the water-fuel emulsion from the burner 30, forcing it to swirl and remain in the inner vessel.

The water-in-oil emulsion which has been mixed and compressed by the pre-heated secondary air stays in the inner vessel 1 which is heated to about 700° to 100° C. Fine water droplets in the emulsion are caused to explode by such high temperature. Simultaneously with evaporation, pyrolysis of the water occurs, and, furthermore, the above shift reaction is caused to occur. The thus formed hydrogen or water gas and the sprayed fuel oil mix together, and the resulting mixture is burned. Furthermore, the oxygen simultaneously formed by the pyrolysis of the water permits rapid and complete combustion with lesser amounts of air than the theoretical amount and, therefore, the amount of fuel oil being consumed can be greatly reduced.

COMPARATIVE EXAMPLE

Case A

Heavy oil A and water were mixed in a ratio of 100 to 65 (ratio of water addition, 39.4%) to prepare a water-in-oil emulsion fuel. The thus prepared fuel was burned in the combustion apparatus of the invention fitted to a commercially available gun type burner.

Case B

An emulsion containing 20% water was burned by the use of the burner alone.

Case C

Heavy oil A alone was burned.

In accordance with each of the methods of Cases A, B, and C, the fuel was burned at an oil pressure of 10 kg/cm² in a combustion furnace having an effective diameter of 800 mm and an effective length of 2,000 mm, which was used to heat the atmosphere for use in the curing step of a dipped polyvinyl chloride article. The results are shown in the table below.

In accordance with the invention, the heat efficiency of a burner can be increased by sixty-seven percent relative to the case where heavy oil alone is used, and the amount of oil consumed can be reduced to sixty percent. Thus, the apparatus and method of the invention can greatly contribute to energy savings.

TABLE

|  | Case A | Case B | Case C |
| --- | --- | --- | --- |
| Ratio of Water (%) | 39.4 | 20.0 | 0.0 |
| Ratio of Heavy Oil A to Water | 100/65 | 100/25 | 100/0 |
| Flame Temperature (°C.) | 1,350 | 1,250 | 1,280 |
| Ratio of Oil Consumed in Relative percent | 60 | 85 | 100 |
| Heat Efficiency of Burner (Relative Percent) | 167 (100) | 118 (71) | 100 (60) |
| Amount of Oil Consumed (l/hour) | 12.6 | 17.85 | 21.0 |

A second embodiment of the combustion apparatus according to the present invention will be described with reference to FIGS. 2 and 3. The combustion apparatus 10' of the invention comprises: an inner vessel 11; an air preheating chamber 12 and an outer vessel 13, and is fitted to the top of a three fluid spray burner 20'The nozzle 22 of the burner 20' is as shown in FIGS. 3a and 3b. In FIG. 3a the reference numeral 31 designates a slit through which water flows; 32 designates slits through which heavy oil flows; and 33 designates gaps through which compressed air flows to provide a swirling action of the mixture. The arrow A indicates the general direction of the composite jet of three fluids. The air preheating chamber 12 is connected to a blower 15, and the vessel 11 has a plurality of small holes 17 through which compressed air is injected into the combustion chamber so as to swirl therein. Quantitative pumps 28 and 29 are provided to deliver oil and water in a predetermined ratio. Oil and water delivered by these pumps and compressed air delivered from rotary blower 27 are jetted into the combustion apparatus 10' through the three-fluid spray burner 20'. Reference number 14 general designates the jet streams which are formed by this action. The jet streams also swirl.

The secondary air from the blower 15 is supplied through preheated air intakes 18 and 19 into the outer vessel, where it is further heated. The secondary air thus heated is injected into the inner vessel 11. The mixed water and oil droplets which have been swirled and compressed by the preheated secondary air stay in the combustion chamber 16 defined by the inner vessel and are heated to about 700° to 1,000° C. Being atomized, the water droplets are caused to explode by such a high temperature, and are gasified with the fuel. As a result, pyrolysis of water occurs and a water gas shift reaction is carried out thus forming hydrogen and water gas. The hydrogen or water gas thus formed and the sprayed fuel-oil mix together and are burned. The oxygen simultaneously formed by the pyrolysis of water permits rapid and complete combustion with the amount of air which is less than the theoretical air amount, and therefore the consumption of fuel oil is greatly reduced.

The combustion method and the combustion apparatus of the invention are as described above. The heat efficiency of the burner is higher by at least sixty percent than that in the case where heavy oil alone is used, and the amount of oil consumed can be reduced to thirty-five to forty percent. Thus, the apparatus and method of the invention greatly contributes to the economical use of energy. That is, in the mixed oil and water combustion apparatus provided by the invention, it is unnecessary to provide a device for preparing oil and water emulsion, and the amount of fuel oil can be readily increased. Thus, the apparatus of the invention can be used for various purposes.

While the invention has been particularly shown and described with reference to preferred embodiments thereof, it will be understood by those in the art that the foregoing and other changes in form and details may be made therein without departing from the spirit and scope of the invention.

What is claimed is:

1. A method for the combustion of a water-oil emulsion fuel having at least a water content of about forty percent comprising simultaneously and separately supplying water, oil and compressed air to a nozzle having a single outlet for mixture of said water and oil in said nozzle, jetting the water-oil emulsion fuel by means of said compressed air from said nozzle into a combustion chamber defined by an inner vessel attached to the nozzle, preheating compressed secondary air in a preheating chamber located between said inner vessel and an outer vessel and introducing said preheated compressed air into the combustion chamber through a plurality of apertures in said inner vessel to compress the flame of the jetted water-oil emulsion fuel and force it to swirl and remain in the combustion chamber for combustion at a temperature of 700° to 1000° C. thereby causing the micro-explosion of the water particles and at the same time the pyrolysis of the water-oil emulsion fuel.

2. A method for the combustion of water-oil emulsion fuel as set forth in claim 1 further comprising directing water through a central passage in said nozzle to said single outlet, directing said oil through passage means surrounding said central passage to mix said oil with said water adjacent said single outlet and directing said compressed air through a plurality of passages disposed tangentially to said single outlet to jet said water-oil emulsion fuel outwardly through said single outlet with a swirling action.

* * * * *